(12) United States Patent  (10) Patent No.: US 8,074,473 B2
Nitschke et al.  (45) Date of Patent: Dec. 13, 2011

(54) METHOD FOR QUENCHING FORMED GLASS SHEETS

(75) Inventors: David B. Nitschke, Perrysburg, OH (US); Dean M. Nitschke, Maumee, OH (US); Cristin J. Reinhart, Delta, OH (US); Donivan M. Shetterly, Bowling Green, OH (US)

(73) Assignee: Glasstech, Inc., Perrysburg, OH (US)

( * ) Notice: Subject to any disclaimer, the term of this patent is extended or adjusted under 35 U.S.C. 154(b) by 1016 days.

(21) Appl. No.: 11/565,717

(22) Filed: Dec. 1, 2006

(65) Prior Publication Data

US 2008/0127678 A1   Jun. 5, 2008

(51) Int. Cl.
*C03B 27/044*   (2006.01)
*C03B 27/00*   (2006.01)
(52) U.S. Cl. ................ 65/114; 65/348; 65/351
(58) Field of Classification Search ........... 65/14, 15, 65/161, 29.1, 29.11, 351
See application file for complete search history.

(56) References Cited

U.S. PATENT DOCUMENTS

| | | | |
|---|---|---|---|
| 3,595,725 A | 7/1971 | Coen | |
| 3,806,312 A | 4/1974 | McMaster et al. | |
| 3,936,291 A | 2/1976 | McMaster | |
| 3,947,242 A | 3/1976 | McMaster et al. | |
| 3,994,711 A | 11/1976 | McMaster | |
| 4,004,901 A | 1/1977 | Starr | |
| 4,282,026 A | 8/1981 | McMaster et al. | |
| 4,404,011 A | 9/1983 | McMaster | |
| 4,437,871 A | 3/1984 | McMaster et al. | |
| 4,470,838 A | 9/1984 | McMaster et al. | |
| 4,512,460 A | 4/1985 | McMaster | |
| 4,525,193 A * | 6/1985 | McMaster et al. | ........... 65/114 |
| 4,575,390 A | 3/1986 | McMaster | |
| 4,661,141 A | 4/1987 | Nitschke et al. | |
| 4,662,925 A | 5/1987 | Thimons et al. | |
| 4,735,646 A | 4/1988 | Aratani et al. | |
| 4,913,720 A | 4/1990 | Gardon et al. | |
| 4,946,491 A | 8/1990 | Barr | |
| 5,004,491 A | 4/1991 | McMaster et al. | |
| 5,236,488 A * | 8/1993 | Vehmas | ........... 65/114 |
| 5,330,550 A | 7/1994 | Kuster et al. | |
| 5,385,786 A | 1/1995 | Shetterly et al. | |
| 5,472,470 A | 12/1995 | Kormanyos et al. | |
| 5,900,034 A | 5/1999 | Mumford et al. | |
| 5,906,668 A | 5/1999 | Mumford et al. | |
| 5,910,620 A * | 6/1999 | O'Keeffe et al. | ........... 65/60.5 |
| 5,917,107 A | 6/1999 | Ducat et al. | |
| 5,925,162 A | 7/1999 | Nitschke et al. | |
| 6,032,491 A | 3/2000 | Nitschke et al. | |

(Continued)

FOREIGN PATENT DOCUMENTS

EP   1 659 100 A1   5/2006

(Continued)

OTHER PUBLICATIONS

Thompson Scientific, London, GB, Database WPI Week 200410, XP-002606400.

(Continued)

*Primary Examiner* — Jason L. Lazorcik
(74) *Attorney, Agent, or Firm* — Brooks Kushman P.C.

(57) ABSTRACT

A three step method and apparatus for quenching a formed glass sheet in a manner that reduces cycle time without excessive temporary surface tension that can cause excessive breakage.

30 Claims, 3 Drawing Sheets

U.S. PATENT DOCUMENTS

| | | | |
|---|---|---|---|
| 6,079,094 A | 6/2000 | Ducat et al. | |
| 6,173,587 B1 | 1/2001 | Mumford et al. | |
| 6,418,754 B1 | 7/2002 | Nitschke et al. | |
| 6,513,348 B2 * | 2/2003 | Shetterly et al. | 65/104 |
| 6,718,798 B2 | 4/2004 | Nitschke et al. | |
| 6,729,160 B1 | 5/2004 | Nitschke et al. | |
| 2002/0189289 A1 | 12/2002 | Shetterly et al. | |
| 2002/0189290 A1 * | 12/2002 | Bennett | 65/104 |
| 2005/0223746 A1 * | 10/2005 | Yoshizawa et al. | 65/114 |

FOREIGN PATENT DOCUMENTS

| | | |
|---|---|---|
| GB | 478811 | 1/1938 |
| JP | 2004-10462 A | 1/2004 |

OTHER PUBLICATIONS

Supplementary European Search Report Dated Dec. 3, 2010, Application No. 07854737.9-2111, Applicant Glasstech, Inc., 6 pages.

\* cited by examiner

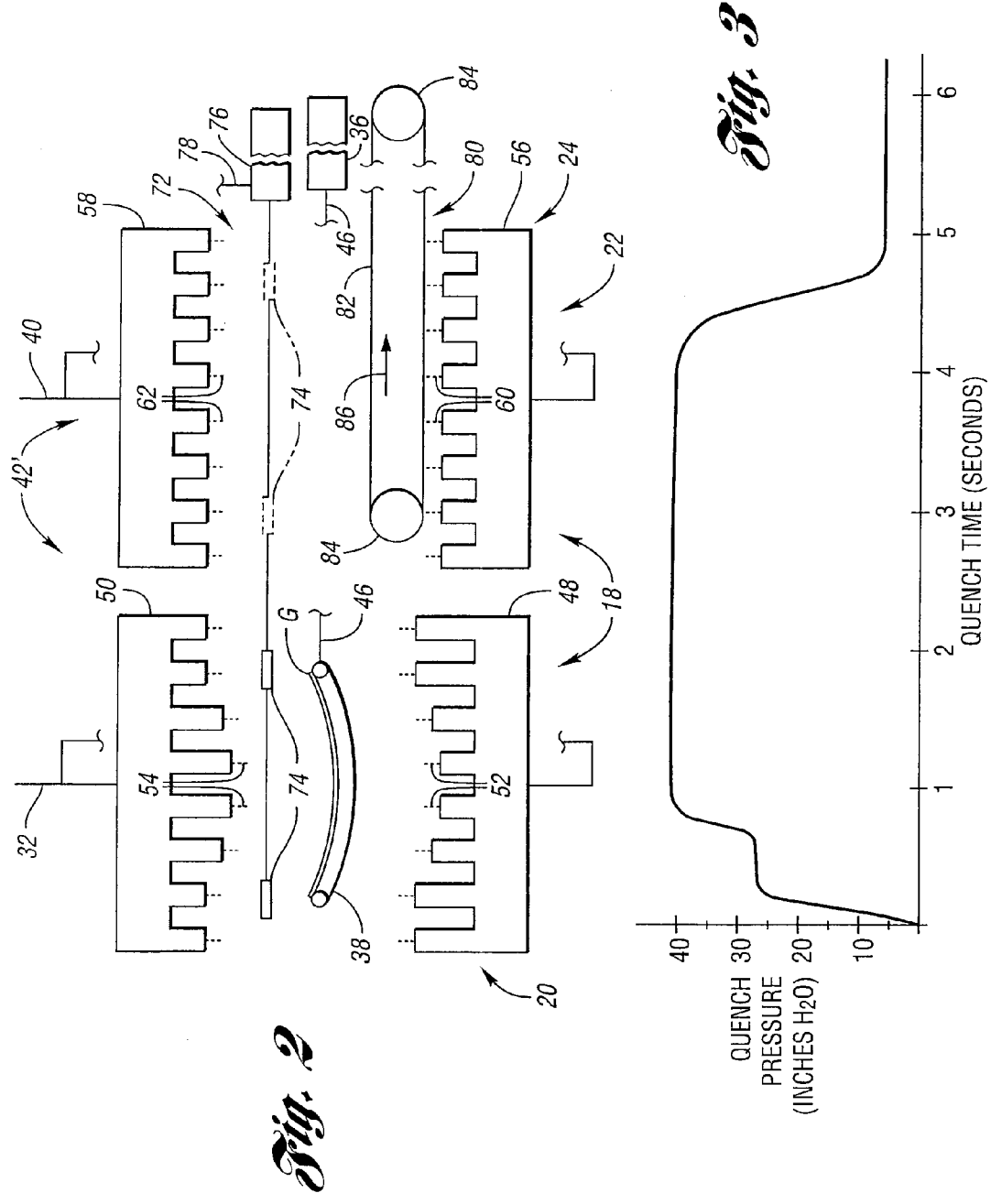

METHOD FOR QUENCHING FORMED GLASS SHEETS

BACKGROUND OF THE INVENTION

1. Field of the Invention

This invention relates to a method for quenching formed glass sheets.

2. Background Art

Formed glass sheets are conventionally quenched to enhance their mechanical properties. Such formed glass sheets are conventionally used on vehicle side and back windows as well as in other applications such as architectural applications and food storage and display units, etc. Usually the forming and quenching is performed to provide tempering that provides the glass sheet with surface compression on the order of 100 MegaPascals (14,250 psi), but the quenching can also be utilized to perform heat strengthening wherein the surface compression is less such as on the order of 50 MegaPascals (7,250 psi).

Conventional forming and quenching systems successively form and quench the glass sheets in a cyclical manner one after another initially at a forming station and then downstream at a quench station. The formed glass sheets can be formed and delivered from the forming station faster than quenching can be performed in the quench station such that reduction in the cycle time of the system is limited by the time of the quenching.

Forced convection is conventionally utilized to perform glass sheet quenching in order to establish a temperature gradient between the glass surfaces and its center, starting from a tempering temperature on the order of about 645° C. and cooling to the ambient. Upon the glass sheet cooling to ambient temperature throughout its extent, the glass surfaces are in a state of compression and the glass center is in a state of tension. The surface compression resists breakage so as to provide mechanical strength to the quenched glass. The extent of the center tension and accompanying surface compression is often measured by the glass break pattern, specifically by counting the number of broken pieces in a number of confined areas, usually by counting each full broken piece as one and each partial piece as one-half and then adding to provide a total. A greater number indicates a greater resistance to breakage. However, the surface stress should not be too great so that the glass breaks into pieces that are too small.

In connection with heating of the glass sheets, see U.S. Pat. No. 3,806,312 McMaster et al.; U.S. Pat. No. 3,947,242 McMaster et al.; U.S. Pat. No. 3,994,711 McMaster; U.S. Pat. No. 4,404,011 McMaster; and U.S. Pat. No. 4,512,460 McMaster. In connection with glass sheet forming, see U.S. Pat. No.: 4,282,026 McMaster et al.; U.S. Pat. No. 4,437,871 McMaster et al.; U.S. Pat. No. 4,575,390 McMaster; U.S. Pat. No. 4,661,141 Nitschke et al.; U.S. Pat. No. 4,662,925 Thimons et al.; U.S. Pat. No. 5,004,491 McMaster et al.; U.S. Pat. No. 5,330,550 Kuster et al.; U.S. Pat. No. 5,472,470 Kormanyos et al.; U.S. Pat. No. 5,900,034 Mumford et al.; U.S. Pat. No. 5,906,668 Mumford et al.; U.S. Pat. No. 5,925,162 Nitschke et al.; U.S. Pat. No. 6,032,491 Nitschke et al.; U.S. Pat. No. 6,173,587 Mumford et al.; U.S. Pat. No. 6,418,754 Nitschke et al.; U.S. Pat. No. 6,718,798 Nitschke et al.; and U.S. Pat. No. 6,729,160 Nitschke et al.; and see also the U.S. patent application Ser. No. 11/255,531, of Vild et al. filed on Oct. 31, 2005. In connection with glass sheet quenching, see U.S. Pat. No.: 3,936,291 McMaster; U.S. Pat. No. 4,470,838 McMaster et al.; U.S. Pat. No. 4,525,193 McMaster et al.; U.S. Pat. No. 4,946,491 Barr; U.S. Pat. No. 5,385,786 Shetterly et al.; U.S. Pat. No. 5,917,107 Ducat et al.; and U.S. Pat. No. 6,079,094 Ducat et al.

SUMMARY OF THE INVENTION

An object of the present invention is to provide an improved method to reduce glass sheet quench processing time.

In carrying out the above object, the method for quenching formed glass sheets in accordance with the invention is performed by moving a formed glass sheet that is heated to a quenching temperature on a quench ring from a bending station into a quench to a quench location where the entire formed glass sheet is between lower and upper quench heads that are operable to supply upward and downward gas flows for quenching the formed glass sheet. Upward and downward initial gas flows are initially supplied through the lower and upper quench heads for about 0.5 to 1.3 seconds at initial pressures to provide initial cooling power that quenches the entire formed glass sheet on the quench ring while in the quench location. This initial pressure quenching can use conventional quench pressures. After the initial pressure quenching, upward and downward subsequent gas flows are supplied, through the same lower and upper quench heads through which the initial gas flows are supplied, for 0.5 to 4 seconds at increased pressures at least 25% higher than the initial pressures to further quench the entire formed glass sheet while still in the quench location without any conveyance therefrom after the initial quenching. Thereafter upward and downward gas flows are supplied to the formed glass sheet at decreased cooling power less than the initial cooling power to eventually provide a tempered and formed glass sheet upon cooling throughout to ambient temperature. When conventional quench pressures are initially used, the latter cooling is performed with decreased cooling power that is less than the cooling power provided by the quench at minimum conventional quench pressures.

The increased pressure quenching is disclosed as being provided by pressures at least 50% greater than the initial quench pressures, specifically with pressures 50 to 100% greater than the initial quench pressures.

The finally mentioned quenching has a decreased cooling power that is no greater than 75% of the initial cooling power and that is preferably no greater than 60% and most preferably about 50% of the initial cooling power.

When the initial quench is performed with conventional quench pressures, the finally mentioned quenching has a decreased cooling power that is preferably no greater than the 80% of the cooling power provided by the quench at minimum conventional quench pressures and that is more preferably no greater than 70% and most preferably about 60% of the cooling power provided by the quench at minimum conventional quench pressures.

Thus, the increased pressure quenching is preferably provided by pressures 50 to 100% greater than the initial pressure quenching, and the finally mentioned quenching has a decreased cooling power that is no greater than 60% of the cooling power provided by the initial pressure quenching and no greater than 70% of the cooling power provided by the quench at minimum conventional quench pressures when the initial cooling is with conventional quench pressures.

In the preferred practice of the method, the quench: (a) is initially in an open position to receive the formed glass sheet between the quench heads; (b) is then moved to a closed position to perform the initial and increased pressure quenching; and (c) is then moved back to the open position to permit delivery of the formed glass sheet in preparation for the next cycle.

The decreased cooling power quenching is performed at least to some extent within the quench. After the initial and increased pressure quenching, the formed glass sheet is disclosed as being moved to an aftercooler to perform at least to some extent the decreased cooling power quenching. More specifically, the decreased cooling power quenching is disclosed as being partially performed within the quench and the formed glass sheet is then moved to the aftercooler to perform further decreased cooling power quenching.

The formed glass sheet is supported on a quench ring for movement into the quench and is also supported on the quench ring during the initial and increased pressure quenching between the lower and upper quench heads. In one practice of the quenching method the formed glass sheet is moved out of the quench on the quench ring. In another practice of the method, the formed glass sheet is lifted upwardly off the quench ring within the quench for subsequent delivery from the quench. In the latter method, the upward gas flow forces the formed glass sheet upwardly against a transfer device for movement out of the quench.

Another object of the present invention is to provide improved apparatus for quenching glass sheets.

The objects, features and advantages of the present invention are readily apparent from the following detailed description of the preferred embodiments when taken in connection with the accompanying drawings.

BRIEF DESCRIPTION OF THE DRAWINGS

FIG. 2 is a partial schematic view similar to FIG. 1 to illustrate another embodiment of the apparatus for performing the formed glass sheet quenching method of the invention in a modified manner.

FIG. 3 is a graph that illustrates quenching pressure versus time with intermediate increased quenching and final decreased quenching in accordance with the present invention.

DETAILED DESCRIPTION OF THE PREFERRED EMBODIMENTS

Figure 1:
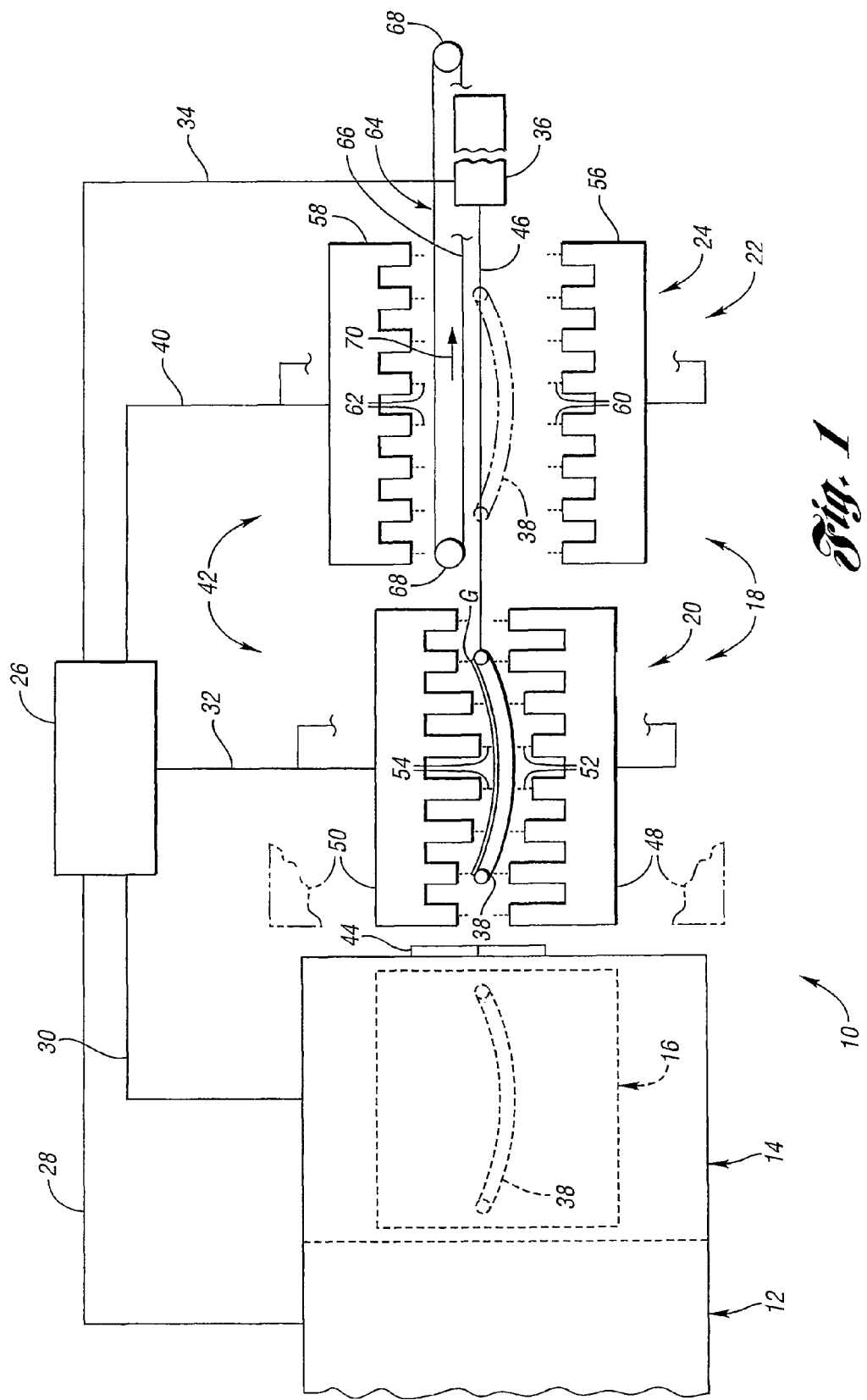
FIG. 1 is a schematic view of one embodiment of apparatus for conducting the formed glass sheet quenching method of the invention.

With reference to FIG. 1, a glass sheet forming and quenching system is generally indicated by 10 and includes a partially illustrated furnace 12 for heating glass sheets to a forming and quenching temperature, a bending station 14 that includes bending apparatus 16 for cyclically forming glass sheets one after another and a quench system collectively indicated by 18. The quench system 18 includes a quench 20 constructed to perform a quenching method of the invention as is hereinafter more fully described, and the quench system also includes an exit cooling station 22 having an aftercooler 24 for continuing forced convection cooling of formed glass sheets as described below. A central control 26 includes: control connections 28 and 30 respectively to the furnace 12 and the bending station 14; control connections 32 and 34 to the quench 20 and an actuator 36 for a quench ring 38 that moves between the bending station 14, the quench 20 and the cooling station 22; and a control connection 40 that operates the aftercooler 24 of the cooling station 22. The quench system 18 includes apparatus collectively indicted by 42 for performing quenching in a manner that reduces the time required in the quench in order to reduce the overall cycle time of the system in successively forming and quenching glass sheets for delivery.

The furnace 12 and bending station 14 may be constructed in any conventional manner but are preferably constructed in accordance with the disclosure of U.S. patent application Ser. No. 11/255,531 of Vild et al. which was filed on Oct. 31, 2005, assigned to the assignee of the present invention, and the entire disclosure of which is hereby incorporated by reference. At its downstream end, the bending station 14 includes a door 44 that is opened and closed to permit the quench ring 38 to be moved by the actuator 36 through a connection 46 into the bending station to receive a formed glass sheet G in preparation for cooling of the glass sheet. The quench 20 of the quench system 18 includes lower and upper quench heads 48 and 50 that have the general shape of the glass sheet to be quenched and that are movable between a phantom line partially illustrated open position and the full solid line indicated closed position. During movement of the quench ring 38 from the bending station 14 to the quench 20, the lower and upper quench heads 48 and 50 of the quench are in the open position and are then closed to commence the quenching. The lower and upper quench heads 48 and 50 respectively then provide upward and downward gas flows 52 and 54 that perform the quenching as is hereinafter more fully described. Thereafter, the quench 20 is moved to its open position and the actuator 36 moves the quench ring 38 to the cooling station 22 into the aftercooler 24 between its lower and upper cooling heads 56 and 58 that supply upward and downward cooling gas flows 60 and 62 but at pressures that provide lesser cooling power than prior quenching in the quench 20 as is more fully described below. The pressure of the upward gas flows 60 is subsequently increased to lift the glass sheet from the quench ring 38 upwardly against a transfer device 64 which is illustrated as a conveyor having a conveying loop 66 extending around wheels 68 at least one of which is rotatively driven to move the lower reach of the conveying loop in the direction shown by arrow 70 so the glass sheet is moved toward the right for further cooling and delivery. After the glass sheet is lifted upwardly from the quench ring 38 in the aftercooler 24, the actuator 36 moves the quench ring 38 back through the open quench 20 to the bending apparatus 16 of the bending station 14 to receive another formed glass sheet for subsequent movement back toward the right into the quench 20 in preparation for commencing the next cycle.

Before completing the description of the manner in which the quenching takes place in the quench system 18, reference should be had to FIG. 2 which illustrates another embodiment of the apparatus 42' which also has a quench 20 and cooling station 22 like the previously described embodiment. However, in this embodiment, a transfer device 72 includes an extractor 74 that is moved by an actuator 76 under the control of a connection 78 to the central system control (not shown in this view) so as to provide coordination with the rest of the system. After the lower and upper quench heads 48 and 50 of the quench 20 are moved to their open position as shown by solid lines in FIG. 2, the pressures of the upward and downward gas flows 52 and 54 are modified to lift the glass sheet upwardly from the quench ring 38 against the extractor 74 of the transfer device 72. Actuator 76 then moves the extractor 74 and the glass sheet toward the right to the aftercooler 24 between its lower and upper cooling heads 56 and 58 whose upward and downward gas flows 60 and 62 are then at pressures that initially maintain the glass sheet upwardly against the extractor as additional cooling is provided. The pressures of the upward and downward gas flows 60 and 62 are then modified so that the glass sheet is released downwardly from the extractor 74 onto a lower conveyor 80 on an upper reach of a conveying loop 82 thereof which extends over wheels 84 at least one of which is rotatively driven to move the glass sheet toward the right as shown by arrow 86 for delivery. After the upward lifting of the glass sheet in the quench 20, the quench ring 38 is moved toward the left by its actuator 36 back to the bending apparatus of the bending station to receive another formed glass sheet in preparation for subsequent movement back to the quench 20 to commence the next cycle.

As previously mentioned, forced convection is conventionally utilized to perform glass sheet quenching in order to establish a temperature gradient between the glass surfaces and its center, starting from a tempering temperature of about 645° C. and cooling to the ambient temperature. Actually, while glass at ambient temperature acts much like a solid, it is actually a highly viscous liquid since glass is amorphous without any crystalline structure. The outer glass surfaces upon initial quenching are cooled and temporarily tensioned for about one second or more. This tension results from greater contraction of the glass outer surfaces as they are initially cooled faster than the glass center which is cooled slower and thus contracts less. The glass surface tension subsequently reduces as the thermal gradient between the cooler glass surfaces and the hotter glass center stops increasing and the stresses partially relax due to flow within the glass. After the glass cools down to a temperature referred to as the "strain point", that is normally approximately 520° C. (964° F.), the glass becomes more viscous and does not move as fast as when it was hotter so relative flow between inner and outer layers is arrested and stress created by thermal contraction differences between layers can no longer be relaxed with time by flow in the glass. The glass center is hotter than the surfaces upon cooling through the strain point temperature. As such, upon the entire glass sheet reaching ambient temperature, the center has cooled through a greater temperature differential and contracted more than the surfaces so the center goes into tension and consequently forces the surfaces into compression. The surface compression as previously mentioned resists breakage so as to provide increased mechanical strength to the quenched glass.

Figure 4:
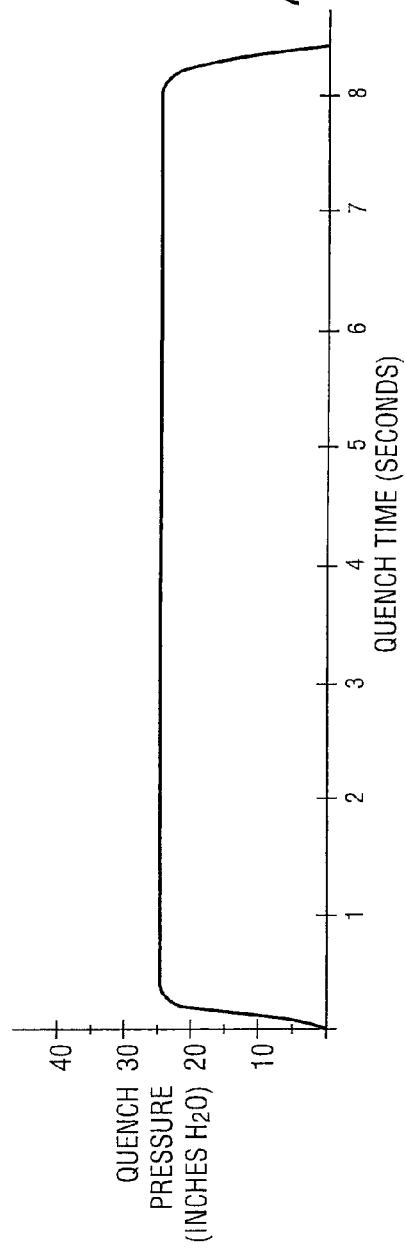
FIG. 4 is a graph that illustrates quenching pressure versus time as performed in a conventional manner without the increased intermediate quenching and the final decreased quenching in accordance with the present invention.

FIG. 3 is a graph that illustrates the quench pressures utilized to perform the quenching in accordance with the present invention versus time and is comparable to the prior art graph illustrated in FIG. 4 which shows that the quenching previously has required a much longer high pressure quench time which increases the cycle time of the entire system. It should be appreciated that the pressures illustrated will vary depending upon the glass thickness, quench construction and compressive surface tension desired such that the specific values shown are for purposes of illustration only. As shown in FIG. 4, conventional quenching uses a constant quench pressure versus time of about 25 inches (63.5 cm) of water column for eight seconds or so to perform quenching that provides an acceptable break pattern for 3.8 mm thick glass. As previously mentioned, the break pattern or, more precisely, a count of the number of particles within a specified area of the broken glass surface, is the standard way of determining the extent of the center tension in the glass and the accompanying surface compression. That entire eight seconds or so must be performed within the quench 20 so that when added to the time of the quench ring movements between the bending station and quench station, or between the bending station, quench station and cooling station, will require a cycle time on the order of about 13 seconds or more. The present invention as described below in connection with FIG. 3 allows a reduction in the time while still providing an equivalent break pattern.

A more complete description of glass sheet tempering will be helpful in understanding the present invention and the manner in which it reduces cycle time. As discussed above, the extent of quenching is measured by the resultant break pattern. Typically, quenching is controlled so that the break pattern satisfies recognized standards to assure glass strength and stresses that provide resistance to breakage. One widely recognized standard is the European Standard identified as ECE R43, which specifies that upon breakage square areas with 5 cm. sides located anywhere on the surface of the broken glass shall have a minimum particle count of no less than 40 and a maximum particle count no greater than 400. This particle count is provided by counting each particle fully within the square as one and each particle partially within the square as one half and then adding to sum the total. The tempered and formed glass sheets are normally tested by breaking in more than one location since the location of the nucleus of the breaking can affect the particle count.

The extent of quenching power for providing formed glass sheets with acceptable temper levels, i.e. recognized break pattern standards, depends on many factors including glass thickness and temperature upon initial quenching, the number of quench nozzle openings for a given area, the spacing of the nozzle openings with respect to each other, the size of the nozzle openings, the proximity of the nozzle opening outlets to the adjacent glass surface, the angles of incidence of the quench jets upon impinging with the glass surface, the pressure of the nozzle jets, the velocity of the nozzle jet flows, and the time length of the quenching, etc. For any given quench and formed glass sheet being quenched, there is a range of pressures that will provide the required effect to meet recognized break pattern standards. This range will thus have minimum and maximum pressures for meeting the standard, and usually the upward flow pressure will be slightly less than the downward flow pressure so the formed glass sheet being quenched will remain on a quench ring that provides its support at the glass periphery. For purposes of this application, "conventional quench pressure" is any pressure in the range of pressures that when applied in the "conventional" constant pressure method for 10 seconds from a specific quench to a specific formed glass sheet heated to a specific quenching temperature will produce a tempered glass sheet upon eventual cooling throughout which when broken provides a break pattern with maximum and minimum particle counts that meet the European Standard ECE R43. As discussed above, the conventional quench pressures, both upward and downward, will have both minimum pressures and maximum pressures that will provide quenching that will produce tempered and formed glass sheets meeting the applicable standard.

The cooling power during quenching is the measure of the heat flow rate per area produced for each degree of temperature difference between the glass and the quenching gases provided by a set of quench factors as described above. When all other factors remain the same, the cooling power increases as the quench pressure increases, and the cooling power decreases as the nozzle to glass spacing increases.

More specifically, the cooling power is the convective heat transfer coefficient of the quenching factors governed by the equation:

$$\Delta Q/\Delta t = (h)(A)(\Delta T),$$

where the rate of the heat flow, $\Delta Q/\Delta t$, is equal to the heat transfer coefficient, h, times the area over which the heat flow was measured, A, times the temperature difference between the glass and the gas of the quench jets, $\Delta T$.

When the heat flow rate is in calories per second, with the area in square centimeters and the temperature difference in degrees Centigrade, the heat transfer coefficient is measured in calories per second per square centimeter per degree Centigrade.

Figure 5:
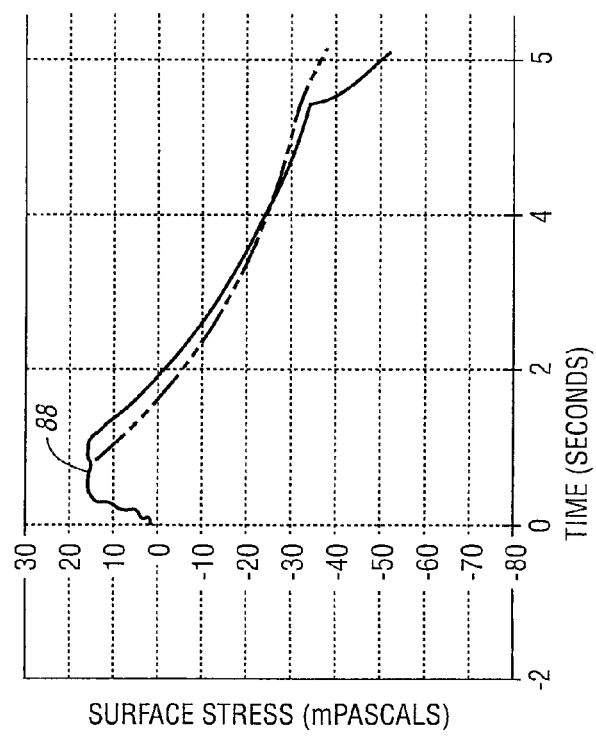
FIG. 5 is a graph that illustrates in solid line representation the surface tension versus time of a glass sheet quenched in accordance with the present invention and compared to phantom line illustrated conventional quenching.

As illustrated in FIG. 1, the present invention provides quenching of a glass sheet that is immediately increased to a conventional pressure for about 0.5 to 1.3 seconds and as shown in FIG. 5 maintains the temporary glass sheet surface tension in the range of about 14 to 20 MegaPascals, below which range there is insufficient quenching and above which range glass fracture is more likely during the quenching. Then, before the maximum temporary glass surface tension substantially decreases, such as at location 88 shown in FIG. 5, the upward and downwardly gas flow pressures at the quench 20 are increased at least 25% through the associated lower and upper quench heads from the initial pressures. More specifically, as illustrated in FIG. 3, the increased pressure quenching is performed for 0.5 seconds to 4 seconds with pressures greater than 50% of the initial pressures and most preferably in the range of 50 to 100% greater than the initial pressures. Thereafter, the upward and downward gas flows to the formed glass sheet are continued at pressures that provide less cooling power than the initial pressures as shown in FIG. 3. This decreased cooling is initially provided within the quench 20 and thereafter within the aftercooler 24 of the cooling station 22 as previously described. More specifically, this decreased quenching is performed with upward and downward gas flows that provide a decreased cooling power that is no greater than 75% of the cooling power of the initial pressure quenching, preferably no greater than 60% of the cooling power of the initial pressure quenching, and most preferably about 50% of the cooling power provided by the initial pressure quenching. When initial conventional quench pressures are used, i.e. those that will produce glass with a break pattern having particle counts that will meet European Standard ECE R43 when continued for about 10 seconds, the decreased cooling power quench is less than the cooling power provided by the quench at minimum conventional quench pressures. More specifically the decreased cooling is then no greater than 80%, preferably less than 70% and most preferably about 60% of the cooling power provided by the quench at minimum conventional quench pressures.

In an actual practice of the present invention, 3.8 mm thick full sized automobile backlites were processed on an actual production furnace and quench under two conditions, specifically under conventional processing and the three step quenching of the present invention.

For the conventional processing, glass temperature at the start of quenching was 643° C., quench pressure was 25 inches of $H_2O$ and the quench time was 8.0 seconds, as in FIG. 4. The break pattern yielded a central particle count of 196 pieces per 5×5 cm square from a break point in the driver's side lower corner. When this conventional quench time was reduced to 4.5 seconds, the particle count was 39 pieces.

For the three step quenching of the present invention, glass temperature at the start of quenching was 643 degrees C., quench pressure started at 25 inches of $H_2O$ for 0.7 seconds, was then increased to 40 inches of $H_2O$ for 3.8 seconds and was then decreased to 6 inches of $H_2O$ for 3.5 seconds, as in FIG. 3. The break pattern yielded a central particle count of 227 pieces in a 5×5 cm square from a break point in the driver's side lower corner. So, the time required to be in the high pressure quench was reduced from 8.0 to 4.5 seconds.

Quenching of the glass with the three steps of quenching described above thus prevents excessive initial temporary surface tension and reduces the cycle time of the processing.

While preferred modes of the invention have been illustrated and described, it is not intended that these modes illustrate and describe all possible forms of the invention. Rather, the words used in the specification are words of description rather than limitation, and it is understood that various changes may be made without departing from the spirit and scope of the invention.

What is claimed is:

1. A method for quenching formed glass sheets comprising:
    moving a quench ring into a bending station to receive a formed glass sheet that is heated to a quenching temperature;
    moving the formed glass sheet on the quench ring from the bending station into a quench to a quench location where the entire formed glass sheet is between lower and upper quench heads that are operable to supply upward and downward gas flows for quenching the formed glass sheet;
    initially supplying through the lower and upper quench heads upward and downward initial gas flows for about 0.5 to 1.3 seconds at initial pressures to provide initial cooling power that quenches the entire formed glass sheet on the quench ring while in the quench location;
    then supplying, through the same lower and upper quench heads through which the initial gas flows are supplied, upward and downward subsequent gas flows for 0.5 to 4 seconds at increased pressures at least 25% higher than the initial pressures to further quench the entire formed glass sheet on the quench ring while still in the quench location without any conveyance therefrom after the initial quenching; and
    thereafter supplying upward and downward gas flows to the formed glass sheet with decreased cooling power that is less than the initial cooling power to eventually provide a tempered and formed glass sheet upon cooling throughout to ambient temperature.

2. A method for quenching formed glass sheets as in claim 1 wherein the increased pressure quenching is provided by pressures at least 50% greater than the initial pressures.

3. A method for quenching formed glass sheets as in claim 1 wherein the increased pressure quenching is provided by pressures 50 to 100% greater than the initial pressures.

4. A method for quenching formed glass sheets as in claim 1 wherein the last recited upward and downward gas flows have a decreased cooling power that is no greater than 75% of the initial cooling power.

5. A method for quenching formed glass sheets as in claim 1 wherein the last recited upward and downward gas flows have a decreased cooling power that is no greater than 60% of the initial cooling power.

6. A method for quenching formed glass sheets as in claim 1 wherein the last recited upward and downward gas flows have a decreased cooling power that is about 50% of the initial cooling power.

7. A method for quenching formed glass sheets as in claim 1 wherein the increased pressure quenching is provided by pressures 50 to 100% greater than the initial pressures, and wherein the last recited upward and downward gas flows have a decreased cooling power that is no greater than 60% of the initial cooling power.

8. A method for quenching formed glass sheets as in claim 1 wherein the quench: (a) is initially in an open position to receive the formed glass sheet between the quench heads; (b) is then moved to a closed position to perform the initial and increased pressure quenching; and (c) is then moved back to the open position to permit delivery of the formed glass sheet in preparation for the next cycle.

9. A method for quenching formed glass sheets as in claim 8 wherein the last recited upward and downward gas flows with decreased cooling power are provided at least to some extent within the quench.

10. A method for quenching formed glass sheets as in claim 8 wherein after the initial and increased pressure quenching the formed glass sheet is moved to an aftercooler where the last recited upward and downward gas flows with decreased cooling power are performed at least to some extent.

11. A method for quenching formed glass sheets as in claim 8 wherein the last recited upward and downward gas flows are provided partially within the quench and wherein the formed glass sheet is then moved to an aftercooler that provides further upward and downward gas flows with decreased cooling power.

12. A method for quenching formed glass sheets as in claim 1 wherein the formed glass sheet is moved out of the quench on the quench ring.

13. A method for quenching formed glass sheets as in claim 1 wherein the formed glass sheet is lifted upwardly off the quench ring within the quench for subsequent delivery from the quench.

14. A method for quenching formed glass sheets as in claim 13 wherein the upward gas flow forces the formed glass sheet upwardly against a transfer device for movement out of the quench.

15. A method for quenching formed glass sheets comprising:
moving a quench ring into a bending station to receive a formed glass sheet that is heated to a quenching temperature;
moving the formed glass sheet on the quench ring from the bending station into an open quench to a quench location where the entire formed glass sheet is between lower and upper quench heads that are operable to supply upward and downward gas flows for quenching the formed glass sheet, and the quench then being moved to a closed position;
initially supplying through the lower and upper quench heads upward and downward initial gas flows for about 0.5 to 1.3 seconds at initial pressures to provide initial cooling power that quenches the entire formed glass sheet on the quench ring in the quench location;
then supplying, through the same lower and upper quench heads through which the initial gas flows are suppled, upward and downward subsequent gas flows for 0.5 to 4 seconds at increased pressures 50 to 100% greater than the initial pressures to further quench the entire formed glass sheet on the quench ring while still in the quench location without any conveyance therefrom after the initial quenching;
thereafter supplying upward and downward gas flows to the formed glass sheet with decreased cooling power that is no greater than 60% of the initial cooling power to eventually provide a tempered and formed glass sheet upon cooling throughout to ambient temperature; and
opening the quench and delivering the quenched glass sheet from the quench.

16. A method for quenching formed glass sheets comprising:
moving a quench ring into a bending station to receive a formed glass sheet that is heated to a quenching temperature;
moving the formed glass sheet on the quench ring from the bending station into a quench to a quench location where the entire formed glass sheet is between lower and upper quench heads that are operable to supply cooling power by upward and downward gas flows for quenching the formed glass sheet;
initially supplying through the lower and upper quench heads upward and downward initial gas flows for about 0.5 to 1.3 seconds at initial conventional quench pressures to initially quench the formed glass sheet on the quench ring while in the quench location;
then supplying, through the same lower and upper quench heads through which the initial gas flows are supplied, upward and downward subsequent gas flows for 0.5 to 4 seconds at increased pressures at least 25% greater than the initial conventional quench pressures to further quench the entire formed glass sheet on the quench ring while still in the quench location without any conveyance therefrom after the initial quenching; and
thereafter supplying upward and downward gas flows to the formed glass sheet with decreased cooling power, that is less than the cooling power provided by the quench at minimum conventional quench pressures, to eventually provide a tempered and formed glass sheet upon cooling throughout to ambient temperature.

17. A method for quenching formed glass sheets as in claim 16 wherein the increased pressure quenching is provided by pressures at least 50% greater than the initial conventional quench pressures.

18. A method for quenching formed glass sheets as in claim 17 wherein the increased pressure quenching is provided by pressures 50 to 100% greater than the initial conventional quench pressures.

19. A method for quenching formed glass sheets as in claim 16 wherein the last recited upward and downward gas flows have a decreased cooling power that is no greater than 80% of the cooling power provided by the quench at minimum conventional quench pressures.

20. A method for quenching formed glass sheets as in claim 16 wherein the last recited upward and downward gas flows have a decreased cooling power that is no greater than 70% of the cooling power provided by the quench at minimum conventional quench pressures.

21. A method for quenching formed glass sheets as in claim 16 wherein the last recited upward and downward gas flows have a decreased cooling power that is about 60% of the cooling power provided by the quench at minimum conventional quench pressures.

22. A method for quenching formed glass sheets as in claim 16 wherein the increased pressure quenching is provided by pressures 50 to 100% greater than the initial quench pressures, and wherein the last recited upward and downward gas flows have a decreased cooling power that is no greater than 70% of the cooling power provided by the quench at minimum conventional quench pressures.

23. A method for quenching formed glass sheets as in claim 16 wherein the quench: (a) is initially in an open position to receive the formed glass sheet between the quench heads; (b) is then moved to a closed position to perform the initial and increased pressure quenching; and (c) is then moved back to the open position to permit delivery of the formed glass sheet in preparation for the next cycle.

24. A method for quenching formed glass sheets as in claim 23 wherein the last recited upward and downward gas flows with decreased cooling power are provided at least to some extent within the quench.

25. A method for quenching formed glass sheets as in claim 23 wherein after the initial and increased pressure quenching the formed glass sheet is moved to an aftercooler where the last recited upward and downward gas flows with decreased cooling power are performed at least to some extent.

26. A method for quenching formed glass sheets as in claim 23 wherein the last recited upward and downward gas flows are provided partially within the quench and wherein the formed glass sheet is then moved to an aftercooler that provides further upward and downward gas flows with decreased cooling power.

27. A method for quenching formed glass sheets as in claim 16 wherein the formed glass sheet is moved out of the quench on the quench ring.

28. A method for quenching formed glass sheets as in claim 16 wherein the formed glass sheet is lifted upwardly off the quench ring within the quench for subsequent delivery from the quench.

29. A method for quenching formed glass sheets as in claim 28 wherein the upward gas flow forces the formed glass sheet upwardly against a transfer device for movement out of the quench.

30. A method for quenching formed glass sheets comprising:

moving a quench ring into a bending station to receive a formed glass sheet that is heated to a quenching temperature;

moving the formed glass sheet on the quench ring from the bending station into an open quench to a quench location where the entire formed glass sheet is between lower and upper quench heads that are operable to supply cooling power by upward and downward gas flows for quenching the formed glass sheet, and the quench then being moved to a closed position;

initially supplying through the lower and upper quench heads upward and downward initial gas flows for about 0.5 to 1.3 seconds at initial conventional quench pressures to initially quench the entire formed glass sheet on the quench ring while in the quench location;

then supplying, through the same lower and upper quench heads through which the initial gas flows are supplied, upward and downward subsequent gas flows for 0.5 to 4 seconds at increased pressures 50 to 100% greater than the initial conventional quench pressures to further quench the entire formed glass sheet while still in the quench location without any conveyance therefrom after the initial quenching;

thereafter supplying upward and downward gas flows to the formed glass sheet with decreased cooling power, that is no greater than 70% of the cooling power provided by the quench at minimum conventional quench pressures, to eventually provide a tempered and formed glass sheet upon cooling throughout to ambient temperature; and opening the quench and delivering the quenched glass sheet from the quench.

* * * * *